(12) United States Patent
Graves

(10) Patent No.: US 7,674,372 B2
(45) Date of Patent: Mar. 9, 2010

(54) WASTEWATER FLOW EQUALIZATION SYSTEM AND METHOD

(76) Inventor: Jan D. Graves, 27 Edgewood Dr., Norwalk, OH (US) 44857

( * ) Notice: Subject to any disclaimer, the term of this patent is extended or adjusted under 35 U.S.C. 154(b) by 19 days.

(21) Appl. No.: 11/698,141

(22) Filed: Jan. 26, 2007

(65) Prior Publication Data
US 2008/0179237 A1 Jul. 31, 2008

(51) Int. Cl.
C02F 1/00 (2006.01)
B01D 35/157 (2006.01)
(52) U.S. Cl. .................. 210/109; 210/232; 210/457
(58) Field of Classification Search ............. 210/747, 210/162, 170.03, 170.08, 172.6, 232, 257.1, 210/320, 541, 532.2, 202, 206, 209, 457, 210/458, 109; 137/271
See application file for complete search history.

(56) References Cited
U.S. PATENT DOCUMENTS

| | | | |
|---|---|---|---|
| 1,248,058 A | 11/1917 | Bailey | |
| 1,564,927 A | 12/1925 | Ballard | |
| 2,547,567 A | 4/1951 | Collison | |
| 3,771,655 A * | 11/1973 | Hudson, Jr. | 210/253 |
| 4,298,470 A | 11/1981 | Stallings | |
| 4,474,210 A | 10/1984 | Schmid | |
| 4,483,370 A | 11/1984 | Talasz | |
| 4,522,533 A | 6/1985 | Campbell | |
| 4,532,038 A | 7/1985 | Reid | |
| 4,756,827 A | 7/1988 | Mayer | |
| 4,838,731 A | 6/1989 | Gavin | |
| 5,107,892 A | 4/1992 | Plachy | |
| 5,154,353 A | 10/1992 | Plachy | |
| 5,186,821 A | 2/1993 | Murphy | |
| 5,413,706 A | 5/1995 | Graves | |
| 5,667,689 A | 9/1997 | Graves | |
| 5,680,989 A | 10/1997 | Plachy | |
| 5,711,536 A | 1/1998 | Meyers | |
| 5,759,415 A * | 6/1998 | Adams | 210/532.1 |
| 5,868,172 A | 2/1999 | Graves | |
| 6,012,871 A | 1/2000 | Bryant | |
| 6,183,631 B1 | 2/2001 | Cormier | |
| 6,261,452 B1 | 7/2001 | Mayer | |
| 6,309,551 B1 | 10/2001 | Suchecki, Jr. | |

(Continued)

OTHER PUBLICATIONS

U.S. Appl. No. 12/222,829—Notice of Allowance mailed Oct. 2, 2009.

*Primary Examiner*—Matthew O Savage
*Assistant Examiner*—Lucas Stelling
(74) *Attorney, Agent, or Firm*—Miles & Stockbridge P.C.; David R. Schaffer, Esq.

(57) ABSTRACT

A wastewater treatment mechanism includes an interior chamber having a peripheral wall preferably provided with two diametrically opposite openings in each of which is received a flow port member having a flow equalization port therein. Depending upon wastewater levels and surges, the flow port members can be removed and replaced by other flow port members of an identical construction, except for different sizes of design flow equalization ports thereof. Therefore, should a wastewater treatment mechanism be installed initially in a wastewater treatment plant with accurately sized flow equalization ports to achieve desired flow characteristics and efficiency, should such flow characteristics change over time because of inefficient flow-through of wastewater, the originally installed flow port members can be readily removed and replaced with identical flow port members except for larger flow equalization ports thereof thereby returning the overall wastewater treatment mechanism to acceptable design flow equalization and efficiency.

31 Claims, 6 Drawing Sheets

U.S. PATENT DOCUMENTS

| | | |
|---|---|---|
| 6,416,667 B1 | 7/2002 | Graves |
| 6,772,789 B1 | 8/2004 | Terry |
| 6,860,994 B2 | 3/2005 | Graves |
| 7,001,527 B2 | 2/2006 | Stever |

* cited by examiner

FIG. 4
FIG. 5
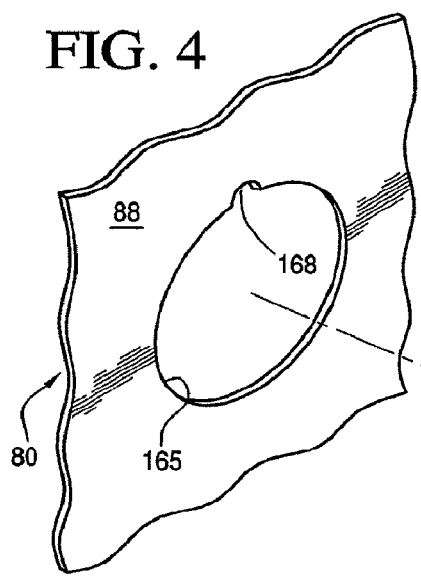
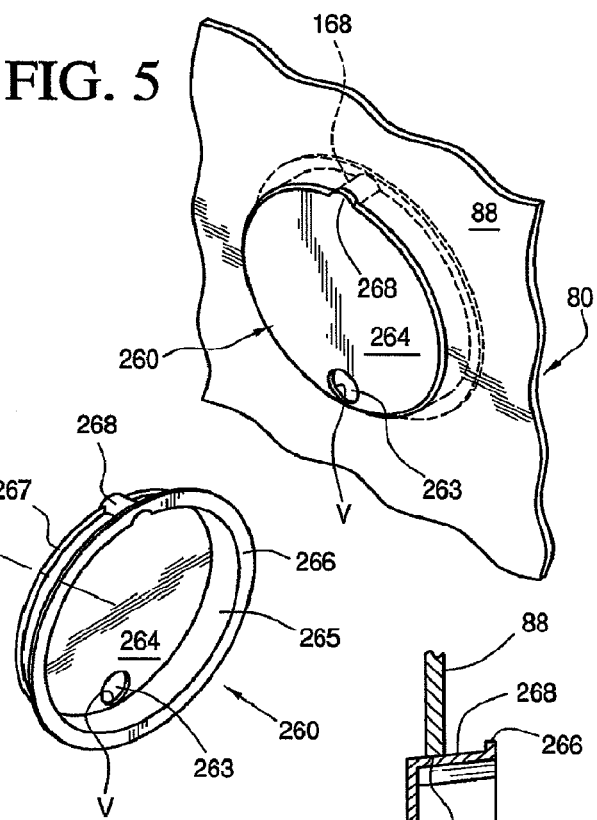
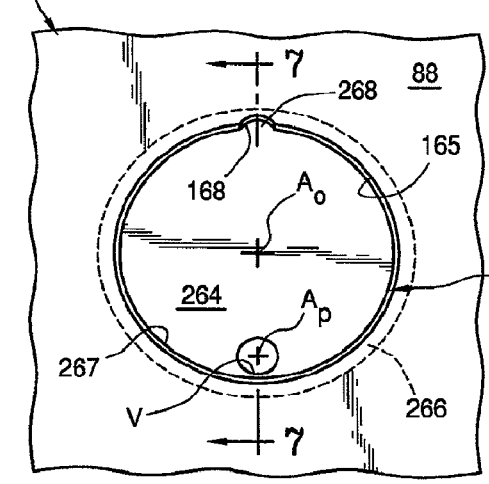
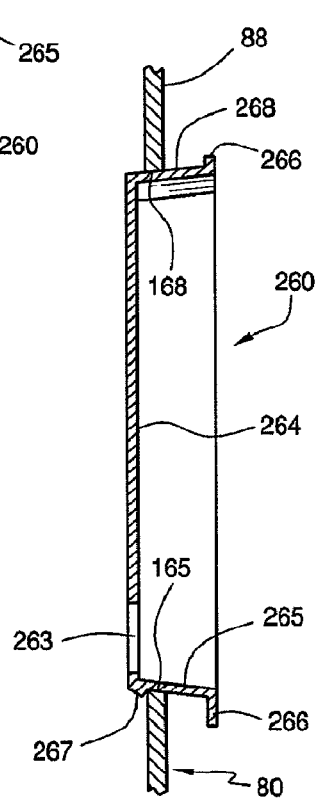
FIG. 6
FIG. 7

US 7,674,372 B2

WASTEWATER FLOW EQUALIZATION SYSTEM AND METHOD

BACKGROUND OF THE INVENTION

This invention is an improvement in wastewater treatment plants or systems, particularly home aeration systems, which experience periodic process upsets of varying load conditions which reduce efficiency. Heretofore the assignee of the present invention patented a wastewater treatment system under U.S. Pat. No. 5,413,706 issued on May 9, 1995 which particularly provided novel flow equalization ports so as to maintain efficiency of the wastewater treatment system even during process upsets or varying load conditions.

In the latter patent the wastewater treatment mechanism 250 of FIGS. 10 through 17 is most representative of prior art and reflects flow equalization provided by three diametrically opposite pairs of vertically spaced flow equalization ports defined by (i) a lowermost diametrically opposite pair of design flow equalization ports, thereabove (ii) a pair of diametrically opposite sustained flow equalization ports, and (iii) a pair of uppermost diametrically opposite peak flow equalization ports. Two or more of the latter pairs of flow equalization ports build up a static head of the wastewater on the upstream side of the wastewater treatment mechanism when the incoming wastewater flow rate exceeds the ability of the flow equalization ports to pass the wastewater at the given static head. The elevation of the lowest pair of diametrically opposite design flow equalization ports determines the normal operating wastewater level of the entire wastewater plant. The second next upper pair of diametrically opposite sustained flow equalization ports are located approximately 3½" above the first diametrically opposite design flow equalization ports and come into play as the induced stream static head continues to increase as liquid level rises upstream. The higher the hydraulic head, the greater the pressure and, therefore, the more water which will proportionately flow out of the lower pair of design flow equalization ports until the next upper pair of sustained flow equalization ports come into operation. In this manner the demand rate flow is achieved at minimal wastewater level fluctuation and minimum hydraulic currents. Finally, should prolonged and excessive incoming wastewater flow exceed the ability of both lower levels of flow equalization ports to pass the wastewater, the pair of uppermost diametrically opposite large size peak flow equalization ports become effective to pass the remaining flow. Over many years the latter wastewater flow equalization mechanism has assured efficient operation, particularly with respect to installation as part of a typical residential/home wastewater aeration system.

The assignee's U.S. Pat. No. 5,413,706 was designed to afford optimum flow equalization for a wastewater treatment plant receiving flow according to a pattern devised by NSF International which was industry developed and accepted to represent a "typical" residential wastewater flow pattern. Most of the data used to derive this wastewater flow pattern came from studies of flow patterns of municipal collecting systems receiving residential wastewater. As such, this pattern represents collective flows, in toto, from a number of residences and small commercial installations. However, each installation has its own unique individual flow pattern based upon a variety of factors. These factors are made up of an infinite number of variables including the number of residents or visitors, the number of plumbing fixtures, lifestyles, etc. However, once these factors are established for each installation, they are likely to stay relatively stable over a time and are generally repeatable. Therefore, having this ability to adapt the flow equalization equipment to the individual characteristics of each wastewater flow pattern allows optimum flow equalization for each unique installation. Such has been provided by the assignee of the latter patent over years of its manufacture and installation of the subject matter thereof.

SUMMARY OF THE INVENTION

Through many years of sales, installation and servicing of the wastewater treatment system of U.S. Pat. No. 5,413,706, the assignee has found that no matter how carefully one might engineer and install the wastewater treatment mechanism 250 of the latter patent and particularly the sizes of the three diametrically opposite pairs of vertically spaced flow equalization ports 267, 268 and 269 formed in a peripheral wall 256 of an outer unit 251 of the wastewater treatment mechanism 250, optimum equalization of wastewater flow or demand rate flow may not necessarily occur. As an example of one problem, a residential or home wastewater treatment installation with which the wastewater treatment mechanism is installed might have, for example, three bedrooms, two baths and typically clothes and dish water outlets. If, at the time of installation, the house is occupied by a husband, wife and two children, the sizing of the flow equalization ports based upon past experience can be readily determined with a high degree of accuracy and, barring changes in usages, no future problems should be expected. However, should this hypothetical family grow to include an additional four children, the original wastewater treatment installation might be severely taxed and, instead of operating at its most efficient level (design flow equalization ports), it might operate predominantly under overflow conditions (peak flow equalization ports) which is highly undesired. If the original house assumed to have the three bedrooms, four occupants, etc. was expanded to include further bathroom facilities and should bathroom, shower and clothes washing increase as children grow older and/or the number of children increase the original wastewater treatment installation would most definitely be pushed to the extreme and process failure could occur.

In keeping with the foregoing, the present invention is directed to a novel wastewater treatment mechanism which includes at a minimum at least one, though preferably two, design flow equalization ports. In the case of a single design flow equalization port, the design flow equalization port would be located at the design flow level of the wastewater treatment mechanism, as is now located the pair of design flow equalization ports of the latter patent. Instead of the single design flow equalization port and no other ports, the wastewater treatment mechanism might instead include a pair of diametrically opposite design flow equalization ports, just as in the latter patent, though no other ports thereabove. In each case the wastewater treatment mechanism would include a container having a peripheral wall and a bottom wall with the peripheral wall being exteriorly surrounded by one or more filters and the peripheral wall including means cooperative with the design flow equalization port or ports to effect relative insertion, removal and/or replacement therebetween.

As one example of the present invention, the peripheral wall of the container might be provided with a pair of diametrically opposite openings which are relatively large and into each of which can be removably secured a flow port member which itself includes a single design flow equalization port of a particular size and specifically a size smaller than the peripheral wall opening. The design flow equalization port of the diametrically opposite flow port members includes an axis below the axis of the peripheral wall opening and the size of each design flow equalization port would be selected so as to accommodate the design flow characteristics of wastewater from a particular single family home wastewater treatment installation, such as that earlier first assumed. Under the previously assumed initial conditions of two adults and two children and based upon past experience of the assignee, there would be little doubt that the wastewater treatment mechanism as just described would be highly efficient. However, as is customary during scheduled maintenance and inspection of wastewater treatment mechanisms or upon automatically generated alarms therefrom, it might well become apparent that the design flow equalization ports are operating inefficiently, particularly years after installation and as the hypothetical family has grown, its numbers increase and wastewater flow correspondingly appreciably increases.

In keeping with the present invention, under physical inspection during scheduled maintenance or repair or upon an automatic alarm, the less than desired efficiency of the design flow equalization ports is readily observed, particularly by the maximum height or maximum range of heights of wastewater reflected upon an exterior surface of the filter member surrounding the peripheral wall containing the flow equalization ports. Solids filtered from the wastewater which do not pass through this filter accumulate upon the exterior thereof to a greater or lesser degree depending upon the upstream head as induced by the pair of design flow equalization ports. If the pair of flow equalization ports are undersized, the "normal" operating liquid level of the wastewater will rise together with solids which accumulate on the upstream side (outside) of the filter. If upon examination of the filter, an extremely high liquid level is observed because of the large amount of solids/sludge/biosolids/scum layer or mat deposited upon the exterior of the filter above the design flow equalization ports, the service personnel knows intuitively and through experience that the design flow equalization ports are undersized. The flow port members are simply removed and both are replaced by a flow port member having a larger flow equalization port than those first installed in the wastewater treatment mechanism. As one example, each of the initial flow port members might have a flow equalization port of ¼" diameter which might be considered, for example, the "standard" design flow equalization port size formed in a "standard" flow port member of a "standard" 1¾" outer diameter accommodated in like sized openings of the container peripheral wall. The service personnel, having quickly recognized from the observed high level or high range of levels of the solids/particulates/scum upon the filter would therefrom necessarily determine that the original design flow equalization ports are now "undersized" to achieve present day (increased family size) flow demands. The pair of flow port members would be removed and, based upon judgment and experience, would each be replaced by another flow port member having a larger design flow equalization port, such as 5/16", 3/8", 7/16", and in reality any diameter up to and virtually including the 1¾" diameter of the peripheral wall openings. By so readily and easily removing and replacing one, two or more flow port members with desired sizes/diameters of flow equalization ports otherwise inefficient flow equalization of the wastewater treatment system is rendered very efficient in an inexpensive and rapid fashion.

In further accordance with this invention, the flow port members are each preferably cup-shaped and each includes a peripheral wall and an end wall with a flow equalization port being formed in the end wall thereof. In addition, the opening in the peripheral or cylindrical wall of the wastewater treatment container is also circular, but the latter and the peripheral wall of the flow port member preferably include a registrable radial projection and slot which assures that each flow port member is properly oriented and inserted into the wastewater treatment container wall opening with the flow equalization port thereof disposed bottommost (six o'clock position) in every installation and for every size of flow equalization port.

In further accordance with the invention, there is preferably one diametrically opposite pair of flow port members associated with each wastewater treatment container wall and an identical diameter flow equalization port associated with each. However, in accordance with the present invention, additional flow equalization ports can be provided in diametrically opposite pairs, preferably above the removable flow port members of the present invention, and the uppermost flow equalization ports may be stationary or removable and may be of the same or varying sizes, depending upon the particular design liquid level of a particular wastewater treatment installation.

With the above and other objects in view that will hereinafter appear, the nature of the invention will be more clearly understood by reference to the following detailed description, the appended claims and the several views illustrated in the accompanying drawings.

BRIEF DESCRIPTION OF THE SEVERAL VIEWS OF THE DRAWINGS

FIG. 4 is an exploded partial fragmentary view of the upper wall portion of the peripheral or cylindrical wall of the molded filter media retainer and spacer housing, and illustrates a circular opening therein prior to the insertion of the flow port member and its associated design flow equalization port.

FIG. 5 is a perspective view similar to FIG. 4, and illustrates the inside of the retainer and spacer housing cylindrical wall after the design flow equalization member has been inserted therein with a locating rib and locating recess of the latter elements being interlocked to accurately locate the design flow equalization port at a lowermost portion of the flow port member.

FIG. 6 is a fragmentary elevational view looking from the inside of the retainer and spacer housing cylindrical wall, and illustrates the diametrically opposite relationship between the locating rib and locating recess and the design flow equalization port.

FIG. 7 is an enlarged cross-sectional view taken generally along line 7-7 of FIG. 6, and illustrates details of the locating rib of the flow port member snap-secured into the locating recess or slot in a peripheral edge portion of the circular opening.

DETAILED DESCRIPTION OF THE INVENTION

Figure 1:
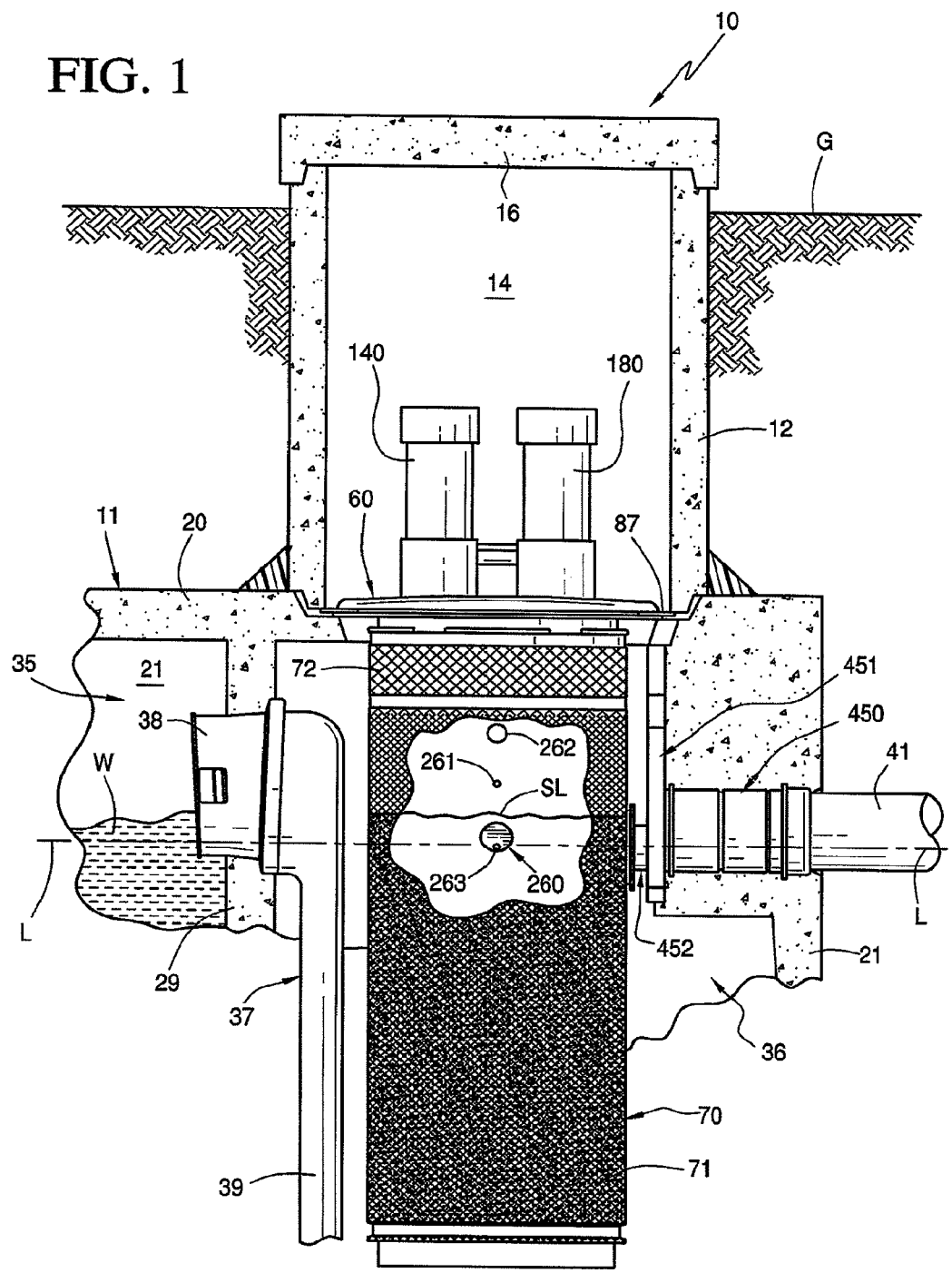
FIG. 1 is a fragmentary longitudinal cross-sectional view of a novel wastewater treatment plant constructed in accordance with this invention, and illustrates a clarification chamber housing a novel wastewater treatment mechanism of the present invention.

The novel apparatus, mechanism and method disclosed specifically hereinafter includes improvements in the wastewater treatment plant of U.S. Pat. No. 5,413,706 dated May 9, 1995 in the name of Jan D. Graves and assigned to Norwalk Wastewater Equipment Company (NORWECO), and the totality of the disclosure of the latter patent is incorporated herein by reference. Much of comparable elements of the latter patent which correspond to elements herein will be described briefly utilizing identical reference numerals to thereby assure compliance with 35 U.S.C. §112, the first paragraph thereof.

In keeping with the present invention, a novel wastewater treatment plant (FIG. 1) is generally designated by the reference numeral 10 and is normally designed for residential use, such as individual homes, although the same is readily adapted to many other facilities and utilizes well known digestion processes of wastewater or like fluid treatment.

The wastewater treatment plant 10 includes an upper concrete casting 11 having two cylindrical risers or castings 12 of which only one is illustrated and which defines a generally cylindrical chamber 14 closed by a cover 16 providing access above finished grade G.

The riser 12 projects upwardly from a top wall 20 of the upper casting 11 which is bound by a peripheral wall 21, closed by a bottom wall (not shown) and includes intermediate walls (also not shown) to form various chambers of the wastewater treatment plant 10, such as a pretreatment chamber (not shown) into which wastewater is introduced, an aeration chamber 35 and a final clarification chamber 36. Incoming wastewater (organic flow and solids) is introduced into the pretreatment chamber, flows into the aeration chamber 35 and exits the aeration chamber through a transfer port (not shown) in the bottom of a wall 29 separating the aeration chamber 35 from the clarification chamber 36, as is fully described in patentee's U.S. Pat. No. 5,667,689 granted on Sep. 16, 1997. Wastewater flow currents are created in the bottom of the clarification chamber 36 through a flow augmenting device 37 having an inlet portion 38 opening into the bottom of the clarification chamber 36 adjacent the earlier mentioned transfer port in the wall 29 resulting in the agitation of solid particles in the lower portion of the clarification chamber 36, as fully disclosed in U.S. Pat. Nos. 5,667,689 and 5,868,172 granted on Feb. 9, 1999. The wastewater W, including scum, biosolids, etc. enters the clarification chamber 36 and rises upwardly along the exterior of a novel wastewater treatment mechanism 50 of the invention eventually departing therefrom through a discharge effluent pipe 41 (FIGS. 1 and 2).

The wastewater treatment mechanism 50 will now be described with particular reference to FIGS. 1 through 3 of the drawings with the direction of wastewater/effluent flow into, through and out of the wastewater treatment mechanism 50 being evident therefrom and as more specifically described in U.S. Pat. No. 5,413,706.

Figure 2:
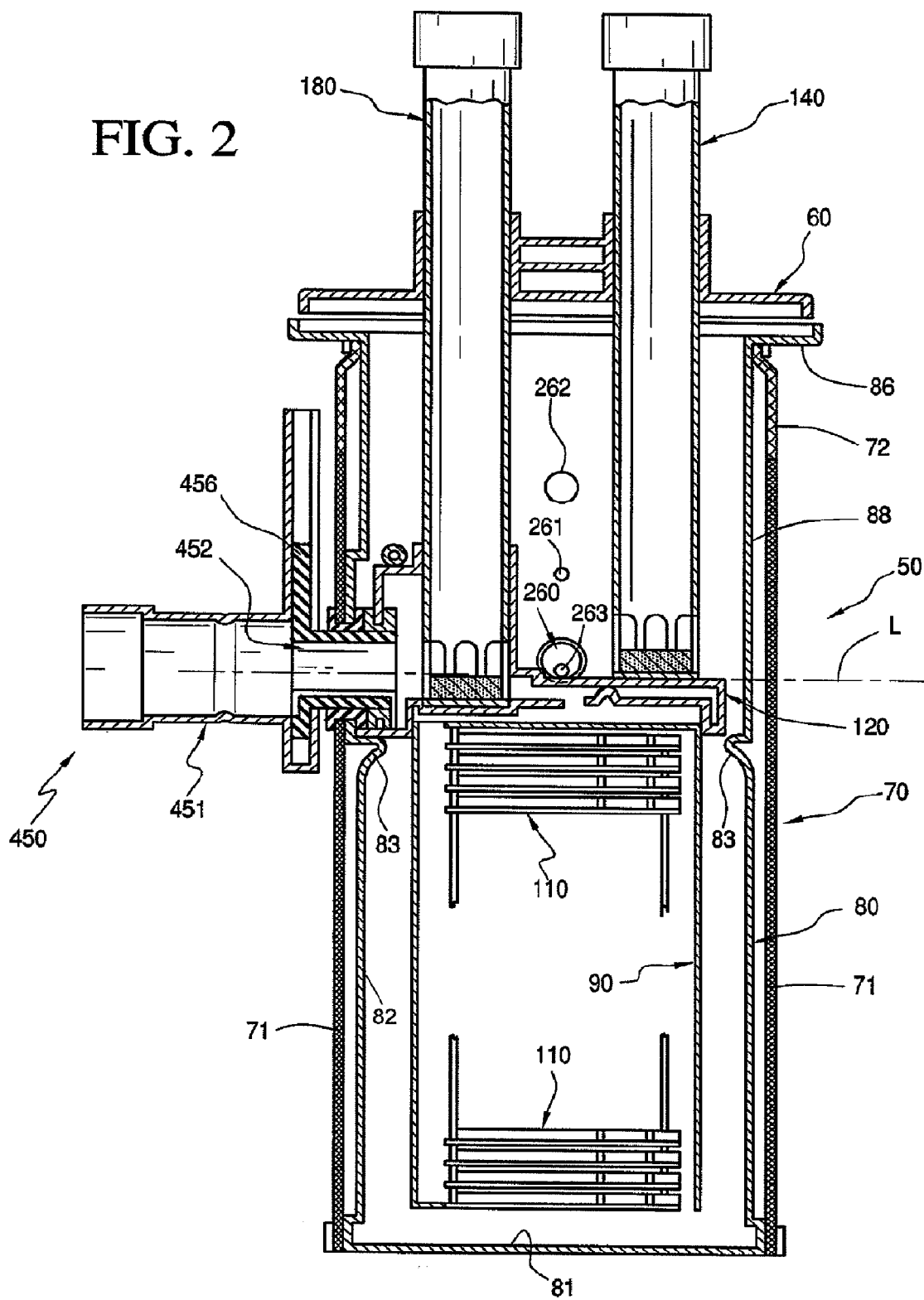
FIG. 2 is an enlarged axial cross-sectional view taken through the wastewater treatment mechanism of FIG. 1, and illustrates an outermost micronically molded filter media or wall, a next inner molded filter media retainer and spacer housing or container, and in an upper portion of a peripheral wall of the latter at least one opening housing an insertable and removable flow port member having a design flow equalization port therein.
Figure 3:
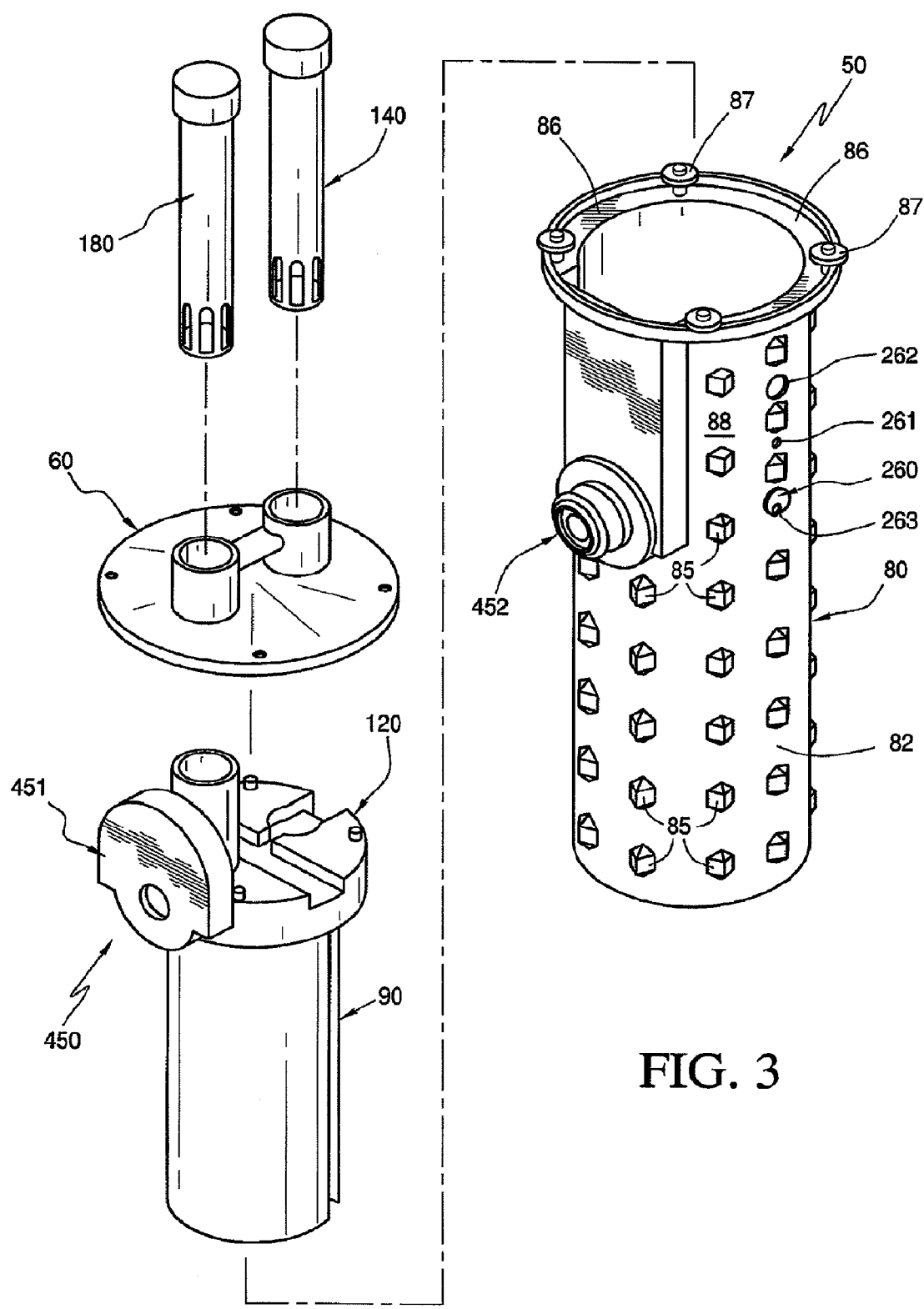
FIG. 3 is an exploded perspective view of the wastewater treatment mechanism of FIGS. 1 and 2, and illustrates the major components thereof including chlorination and dechlorination tubes, an exterior uppermost cover, and a plurality of outwardly projecting integral wall portions of the molded filter media retainer and spacer housing for spacing the outermost filter media relative thereto.

The individual major components of the wastewater treatment mechanism 50 includes filtering means 70, housing means 80 inboard thereof for retaining and spacing the filtering means 70, an innermost housing 90 which houses therein a baffle plate assembly 110 closed by an upper closure assembly 120 upon which is supported a dry tablet chlorination tube 140 and a dry tablet de-chlorinization tube 180, and an uppermost and outermost closure or cover 60 (FIG. 2).

The filtering means 70 is a one-piece cylindrical micronically molded polymeric/copolymeric flow filter media or wall formed as two cylindrical filters of different meshes, namely, a lower relatively fine mesh cylindrical filter media wall 71 and thereabove a more coarse cylindrical filter media wall 72.

The filtering means 70 is conventionally secured to the exterior of the housing means 80 which is also molded from synthetic polymeric/copolymeric material to define a retainer and spacer housing or container 80 having lower circular bottom wall 81, a cylindrical wall 82, a single radially inwardly directed cylindrical rib or multiple radially inwardly directed cylindrically spaced ribs or supporting portions 83, a plurality of outwardly directed vertically and circumferentially spaced filter media retainer and spacer ribs or projections 85 (FIG. 3), an uppermost radially outwardly directed peripheral rim 86 having a plurality of locking lugs 87 for conventionally locking thereto the uppermost closure 60 (FIG. 2), and an uppermost cylindrical wall portion 88.

Most importantly, the present invention includes the utilization of at least one but preferably two diametrically opposite means 260 (FIGS. 1 through 8) in the upper cylindrical wall portion 88 of the filter media retainer and spacer housing 80 for achieving design wastewater flow equalization when the wastewater W is at or somewhat above the liquid level L in accordance with pre-established design flow characteristics. The upper portion 88 of the cylindrical retainer and spacer housing 80 also includes a diametrically opposite pair of sustained flow equalization ports 261 and thereabove another and somewhat larger diametrically opposite pair of peak flow equalization ports 262 which will be described more fully hereinafter. However, subsequent to achieving desired flow equalization and wastewater treatment, the treated wastewater is discharged from the wastewater treatment mechanism 50 via effluent line 41 through the intermediary of a two-part relatively sliding flange coupler 450 (FIG. 2) including a first flange coupler 451 retained in the peripheral wall 21 of the upper casting 11 (FIG. 1) and sealingly bonded to the discharge effluent pipe 41, and a second flange coupler 452 connected to the retainer and spacer housing 80 and having a vertical flange 456 all cooperatively functioning as specifically set forth in U.S. Pat. No. 5,413,706. The latter vertical sliding arrangement between the flange couplers 451, 452 permits the wastewater treatment mechanism 50 to be vertically inserted in and withdrawn from the clarification chamber 36 upon removing the outermost cover 16 (FIG. 1). Upon removing the entire wastewater treatment mechanism 50 to a point above finished grade G, the exterior of the filtering means 70 is readily visible for the purpose heretofore described which will be more fully described hereinafter to determine whether the wastewater treatment mechanism 50 is operating efficiently and within desired flow characteristic design parameters.

The hydraulic head of the wastewater is, as was heretofore briefly described, determined by the wastewater level L (FIG. 1) and the rate of flow of the wastewater/effluent through the wastewater treatment mechanism 50 will depend upon the head or height of the wastewater W in the wastewater clarification chamber 36, the rate of flow of the wastewater through the lower filter wall or media 71, the upper filter wall or media 72, etc., the size of the solids or particulates involved during filtration, settling, etc., and most importantly the pairs of flow equalization ports 261, 262 and a design flow equalization port 263 in each of a pair of diametrically opposite flow port member 260. Under "normal" hydraulic head, the level L of the wastewater W is generally at, slightly below or slightly above the level L of FIG. 1 which approximates the position of the one or a diametrically opposite pair of flow port members 260, each of which includes the design flow equalization port 263 (FIGS. 1, 2 and 4 through 7) located in a circular end wall 264 which merges with a peripheral wall 265 and terminates in a radially outwardly directed peripheral flange 266. Under the first assumed residential installation, each flow equalization port 263 is ¼" diameter. Each flow port member 260 further includes a circumferential radially outwardly directed securing rib 267 and diametrically opposite the design flow equalization port 263 is a radially outwardly directed locating wall portion, projection or rib 268. The outermost diameter of the peripheral or circumferential rib 267 is slightly greater than the diameter of an opening 165 (FIG. 7) in the upper portion 88 of the retainer and spacer housing 80, and is slightly smaller than the diameter of the rib 267 and appreciably smaller than the maximum diameter of the peripheral wall 265 and the terminal peripheral flange 266. The openings 165, 165 are diametrically opposite each other in the upper wall portion 88 of the retainer and spacer housing 80 and each opening 165 includes a locating slot or notch 168 which registers with the locating rib or projection 268, as is most evident in FIGS. 5 and 6. The rib 268 and slot 168 thereby cooperatively define locating means for assuring that the design flow equalization port 263 is at a lowermost position of the circular end wall 264 with an axis Ap (FIG. 6) of the design flow equalization port 263 being in vertical alignment with a central axis Ao of the opening 165 and in a plane vertically bisecting the slot or notch 168 and the rib 268. The latter locating means thereby locates volute V, which is the lowest portion of each design flow equalization port 263, in horizontal alignment or in the same horizontal plane as the design flow line or liquid level L (FIG. 1). Accordingly, in the scenario heretofore described of a residence or house occupied initially by two adults and two small children, a single properly sized design flow equalization port 263 in a single flow port member 260 would efficiently achieve desired wastewater treatment and no additional flow equalization ports, such as the flow equalization ports 261, 262, disposed each individually or in diametrically opposite pairs would be required.

However, in one preferred embodiment of the invention, there are two diametrically opposite circular openings 165 formed in the upper wall portion 88 of the retainer and spacer housing 80 with each of the openings receiving in snap-secured relationship thereto one of the flow port members 260 with its associated design flow equalization port 263 located with its volute V in the horizontal plane of the design flow line L (FIG. 1). In this case, the opposite pairs of sustained flow equalization ports 261 and peak flow equalization ports 262 could be totally eliminated (not shown) or retained, as illustrated in FIGS. 1 and 2. Alternatively, the diametrically opposite pair of flow equalization ports 261, 261 could be eliminated, leaving only the flow equalization ports 262, 262 and 263, 263 or, alternatively, the pair of diametrically opposite flow equalization ports 262, 262 can be eliminated leaving only the diametrically opposite pairs of flow equalization ports 261, 263. If all three pairs of flow equalization ports 261, 262 and 263 are retained, the diameter of all is preferably the same and preferably corresponds to the diameter of the design flow equalization ports 263, 263 of the wastewater treatment mechanism 50 when initially installed. This initial sizing of all three pairs of flow equalization ports 261, 261; 262, 262 and 263, 263 is possible because each of the flow port members 260 can be subsequently removed at any time, even after years of initial installation, to be replaced by like flow port members except each would include a larger diameter flow equalization port in each wall 264 thereof, as will be more apparent hereinafter.

Under the first assumed residential installation occupied by two adults and two children, the level L of the wastewater W would be clearly reflected upon the exterior of the lower cylindrical filter wall 71 and would under perfect flow conditions vary in vertical height ranging two to three inches above the level L (FIG. 1), perhaps at times approaching the sustained flow equalization ports 261, 261 but rarely reaching the same.

Since the clarification chamber 36 receives settled, but not filtered, treated wastewater, the outer surface of the filter media 70 below a particular liquid level L or a range of varying liquid levels takes on a "dirty brown" appearance from the presence of solids, solid particulates, sludge, scum, etc. If a surge occurs raising the liquid level in the clarification chamber 36 beyond a single design flow equalization port or a pair of diametrically opposite ports 263 and the liquid is metered out therethrough over time and eventually returns the liquid level to the design flow level L, under such circumstances, there is usually a corresponding staining of the filter wall 70 and an upper visually apparent brown line or sludge line SL forms on the exterior of the filter wall 70 above the design flow liquid level (FIG. 1). The density of this sludge line SL and/or the amount of solids retained on the exterior surface of the filter wall 70 is usually directly proportional to the volume or duration of such surges. Visual inspection of this darkened area above the design flow level L up to the brown line or sludge line SL dictates that the system would benefit from a larger design flow port to allow such surges to exit the system more quickly and not raise the liquid level L in the clarification chamber 36 to an undesired vertical height or for an undesired long period of time. Thus, by providing a removable/adjustable design flow equalization port member or insert 260 of a single generally standard exterior diameter, but with different diameter design flow equalization ports 263, better efficiency and lower operational life between service visits can be readily accomplished which, of course, is not provided by the system of U.S. Pat. No. 5,413,706.

Returning to the first assumed residential installation, during regular servicing when the wastewater treatment mechanism 50 is removed from the final clarification chamber 36, the location of the scum line SL of FIG. 1 is readily apparent to the service person. Since the scum line SL is within the desired design wastewater flow characteristics (between the design and sustained flow equalization ports 263, 261, respectively), no change is required with respect to the size of the design flow equalization ports 263, 263 of the flow port members 260, 260. The entire wastewater flow mechanism 50 can under these assumed conditions be thoroughly clean, rinsed, flushed and otherwise serviced and then replaced to the original position illustrated in FIG. 1 of the drawings.

Assuming, as was done earlier, that the number of children increase, additional bathroom facilities are added, etc., a time may come when desired design minimal wastewater level fluctuations and minimum hydraulic currents are appreciably exceeded to the extent that the level L of the wastewater W (FIG. 1) not only rises above the sustained flow equalization ports 261, 261 but extends well above the same even beyond the filter wall 71 and to the filter wall 72 eventually forming another scum line SL' (FIG. 8) The scum line SL' is undesirably vertically beyond the design flow equalization ports 263, 263, the sustained flow equalization ports 261, 261 and, well beyond even the peak flow equalization port 262, 262 and well within the coarse filter wall 72, as is reflected by stippling appearing thereon. Trained service personnel during regular maintenance would first observe the undesirably high location of the scum line SL' (FIG. 8), and thereafter thoroughly clean the exterior surface of the filter walls 71, 72, as well as the totality of the interior, exterior and all components of the wastewater treatment mechanism 50. However, recognizing that the location of the scum line SL' visually depicts inefficient operation of the wastewater treatment mechanism 50 specifically because of the now recognized undersizing of the original design flow equalization ports 263, 263/flow port members 260, 260 relative to present increased flow, the latter would each be removed and replaced by another flow member 260' (FIG. 9) having a design flow equalization port 263' larger than the design flow equalization port 263. The particular new diameter size of the design flow equalization port 263' of each flow port member 260' would be based upon the experience of the service personnel, particularly in recognizing the height of the scum line SL' of FIG. 8 and the change in wastewater flow characteristics from the original installation to date as, for example, increased numbers and ages of adults and/or children, added bathroom facilities, etc. As one specific example, initially the diametrically opposite pairs of design equalization ports 263 (FIGS. 1 and 8) might be ¼" diameter. However, if at service it appears that the overall system would benefit from a different flow equalization pattern, as is evident from the height of the scum line SL' of FIG. 8, the service personnel would simply remove the diametrically opposite pair of flow port members 260, 260 and replace either or preferably both with a flow equalization member 260' and its larger diameter design equalization port 263' (FIG. 9), such as a diameter of ⁵⁄₁₆", ⅜", ⁷⁄₁₆" or up to a diameter substantially approaching the diameter of the diametrically opposite openings 165 in the upper wall portion 88 of the filter media retainer and spacer housing 80, namely, 1¾".

Figure 8:
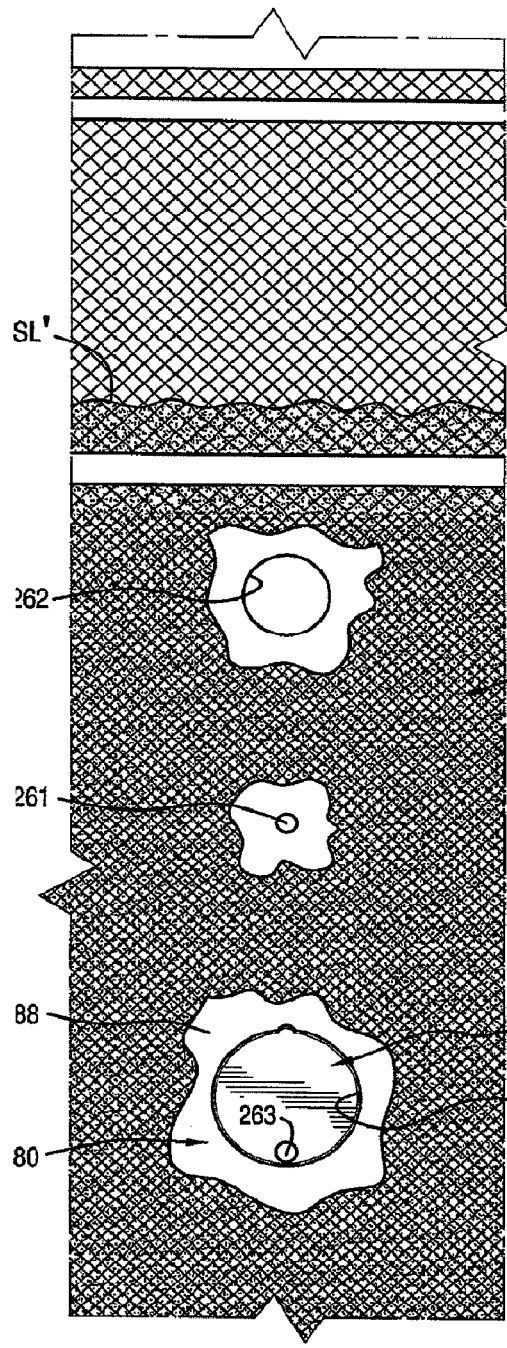
FIG. 8 is a fragmentary elevational view of the outside of the molded filter media or wall, and illustrates in the background an upper peak flow equalization port, a next lower sustained flow equalization port, and in the broken away portion, the flow port member and the design flow equalization port thereof, and with an exterior of the filter media or wall being stippled to indicate an undesirably high accumulated scum layer above the peak flow equalization port evidencing the necessity of increasing the size of the design flow equalization port.
Figure 9:
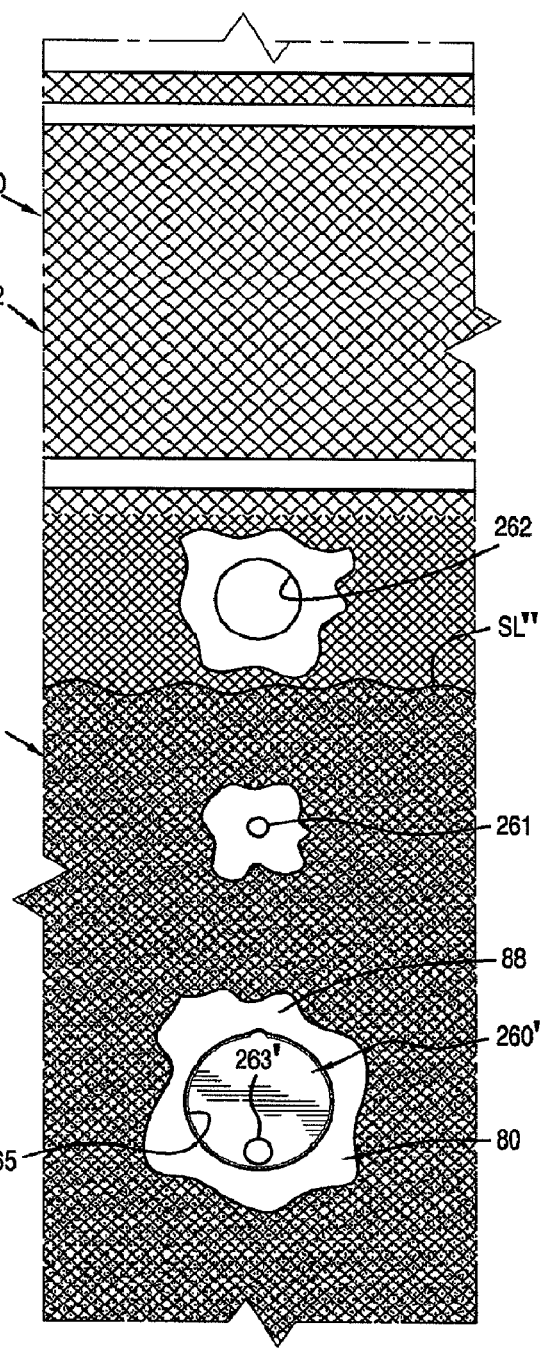
FIG. 9 is a fragmentary elevational view of the outside of the molded filter media of FIG. 8, and illustrates in the background the upper peak flow equalization port, the next lower sustained flow equalization port, and illustrates through stippling a lowering of the scum line of the scum layer of FIG. 8 upon utilizing a larger design flow equalization port in a flow port member of FIG. 9 substituted for the flow port member of FIG. 8.

With respect to FIG. 9, it is assumed that during regular scheduled service or maintenance, the design flow equalization port members 260, 260 of FIG. 8 were replaced by the flow port members 260', 260' of FIG. 9 with the larger design flow equalization port 263' being ⅜" in diameter. During such replacement, the service person would merely snap-out each flow port member 260 and its ¼" diameter flow equalization port 263 (FIG. 8), snap-insert each flow port member 260' and its ⅜" diameter flow equalization port 263' into its opening 165, reinstall the wastewater treatment mechanism 50 and its components, and subsequently observe height changes of the scum line SL'. Perhaps three months, six months or a year later upon such inspection or because of an automatic wastewater level sensing alarm, the service person might find, as is illustrated in FIG. 9, that the larger diameter (⅜") of the diametrically opposite design flow equalization ports 263', 263' has reduced the height of the scum line SL' of FIG. 8 to a lower and more acceptable scum line level SL", namely, specifically appreciably below the coarse filter wall 72 and, should the upper portion 88 of the retainer and spacer housing 80 include one or more peak flow equalization ports 262, well below the latter (FIG. 9).

Figure 10:
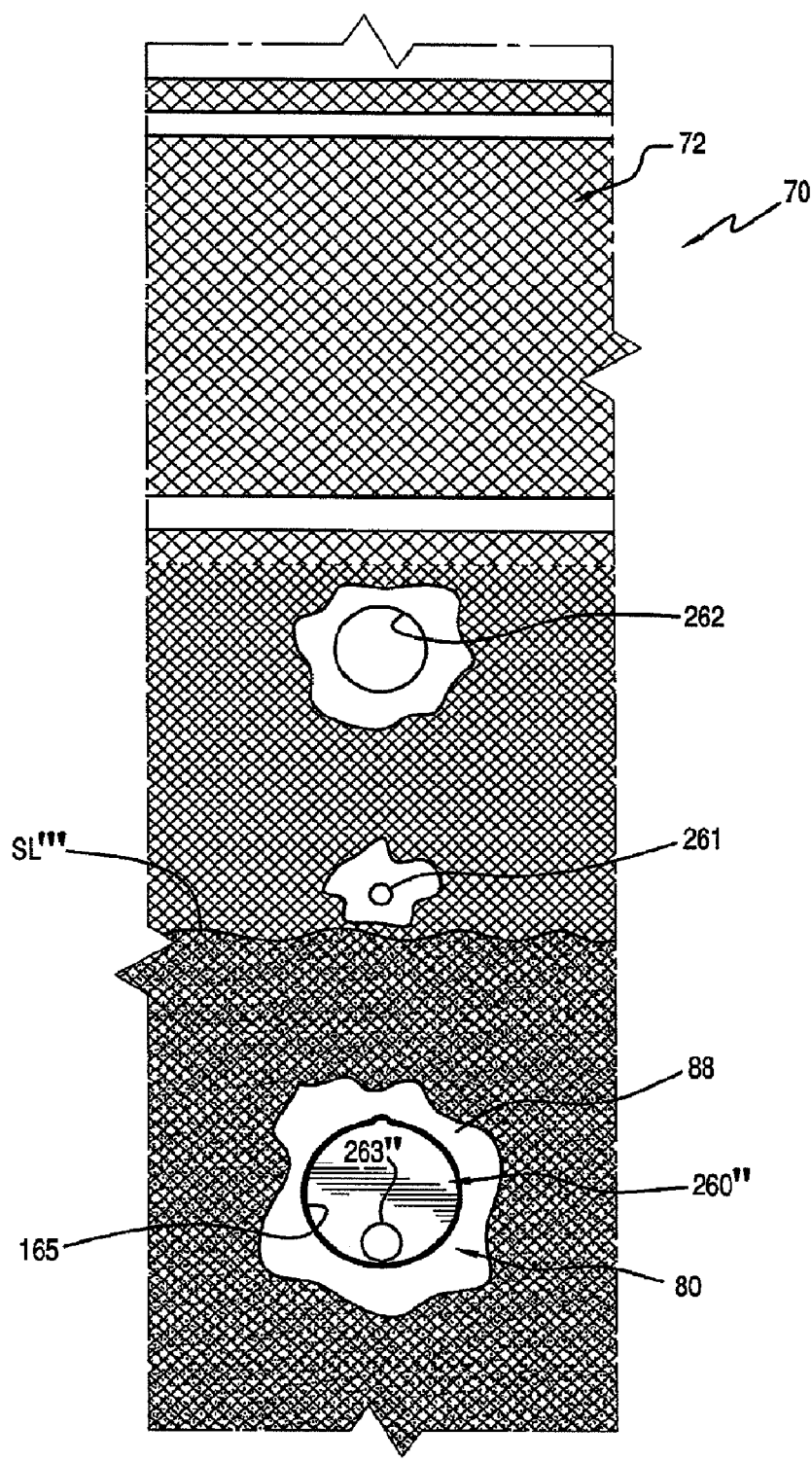
FIG. 10 is a fragmentary elevational view of the outside of the molded filter media of FIGS. 8 and 9, and illustrates in the background the upper peak flow equalization port, the next lower sustained flow equalization port, and an acceptable height of the scum line of the scum layer after a yet larger design flow equalization port of another flow port member was substituted in FIG. 9 for the flow port member of FIG. 9.

Though the service personnel might find acceptable the level of the scum line SL" of FIG. 9, nonetheless if there were concerns over high use surges, each of the flow port members 260', 260' (FIG. 9) could be removed and replaced by an identical snap-in flow port member 260" (FIG. 10) differing from the flow port members 260', 260' only in that the design flow equalization port 263" thereof is of a larger diameter, as, for example, ⁷⁄₁₆". Thereupon the wastewater treatment mechanism 50 would be completely serviced and reinserted into the clarification chamber 36 and when next inspected three months, six months or more later, the scum line SL'" might be observed to have dropped appreciably and to a very acceptable level never having reached during wastewater equalization or surging either the diametrically opposite pair of sustained flow equalization ports 261, 261 or the diametrically opposite pair of peak flow equalization ports 262, 262 thereabove.

In a working embodiment of the present invention, the wastewater treatment mechanism 50 is constructed substantially as herein described and illustrated including the diametrically opposite pair of flow port members 260, 260 (FIGS. 1-3 and 8) each with a design flow equalization port 263 therein, diametrically opposite sustained flow equalization ports 261, 261 and opposite diametrically opposite peak flow equalization ports 262, 262. The flow equalization ports 261, 263 are each of the same diameter, namely, ¼" while the diameter of each of the peak flow equalization ports 262 is preferably 1". The volute-to-volute (bottommost portion-to-bottommost portion) vertical distance between the flow equalization ports 261, 262 is 2½" while the volute-to-volute vertical distance between the flow equalization ports 261, 263 is 3½". The vertical distance between the volute of each flow equalization port 261 to the axis $A_O$ (FIG. 6) of the opening 165 in the upper cylindrical portion 88 of the filter media retainer and spacer housing 80 is approximately 2⅝".

Though the latter working embodiment of the invention is presently preferred, in keeping with the present invention the flow equalization ports 261, 261 and 262, 262 can be totally eliminated, and in such a case, only the design flow equalization ports 263, 263 of the flow port members 260, 260 would be utilized, preferably in diametrically opposite pairs, though, as latter noted, depending upon wastewater flow input and surges, a single, albeit larger, design flow equalization port 263 can be utilized in but a single flow port member 260 of the wastewater flow mechanism 50.

Though the method of removing and replacing one or one pair of flow port members 260, 260 with another one or pair of flow port member 260', 260'; 260", 260" has been described with respect to on-site inspection by service personnel, the clarification chamber 36 can as well be provided with wastewater level detecting means of a conventional construction which through conventional electronics, phone lines, the Internet, etc., can provide an alarm reflective of undesired wastewater level/surges and the subsequent dispatch of service personnel to proceed in accordance with the servicing/maintenance heretofore described, including removal and reinsertion of appropriate flow port members and their associated design flow equalization ports.

Although a preferred embodiment of the invention has been specifically illustrated and described herein, it is to be understood that minor variations may be made in the apparatus without departing from the spirit and scope of the invention, as defined by the appended claims.

What is claimed is:

1. A wastewater treatment mechanism comprising a chamber defined in part by a cylindrical wall, means for effecting flow equalization in a direction from an exterior of said chamber to an interior of said chamber through said cylindrical wall, and means for removably supporting said flow equalization effecting means relative to said cylindrical wall whereby said flow equalization effecting means can be removed and replaced by other flow equalization effecting means possessing flow equalization characteristics differing from the flow equalization characteristics of said first-mentioned flow equalization effecting means to maintain a scum line at a height on means for filtering wastewater prior to effecting flow equalization thereof by said flow equalization effecting means that is within predefined wastewater flow characteristics, and said first-mentioned flow equalization effecting means including a member, the member including a flow equalization port disposed in a circular end wall of said flow port member.

2. The wastewater treatment mechanism as defined in claim 1 including means for accurately locating said flow equalization effecting means relative to said cylindrical wall.

3. The wastewater treatment mechanism as defined in claim 1 wherein said removably supporting means includes an opening in said cylindrical wall of a size and configuration substantially mirroring said flow equalization effecting means.

4. The wastewater treatment mechanism as defined in claim 1 wherein said removably supporting means is an opening in said cylindrical wall housing said member.

5. The wastewater treatment mechanism as defined in claim 1 including second means for effecting flow equalization in a direction from an exterior of said chamber to an interior of said chamber through said cylindrical wall, and said first-mentioned and second means for effecting flow equalization are in superposed relative relationship to each other.

6. The wastewater treatment mechanism as defined in claim 1 including second means for effecting flow equalization in a direction from an exterior of said chamber to an interior of said chamber through said cylindrical wall, and said first-mentioned and second means for effecting flow equalization are in superposed vertically aligned relative relationship to each other.

7. The wastewater treatment mechanism as defined in claim 1 including second means for effecting flow equalization in a direction from an exterior of said chamber to an interior of said chamber through said cylindrical wall, said first-mentioned and second means for effecting flow equalization are in superposed relative relationship to each other, and said first-mentioned flow equalization effecting means is located below said second flow equalization effecting means.

8. The wastewater treatment mechanism as defined in claim 1 including second means for effecting flow equalization in a direction from an exterior of said chamber to an interior of said chamber through said cylindrical wall, said first-mentioned and second means for effecting flow equalization are in superposed vertically aligned relative relationship to each other, and said first-mentioned flow equalization effecting means is located below said second flow equalization effecting means.

9. The wastewater treatment mechanism as defined in claim 1 wherein said removably supporting means includes an opening in said cylindrical wall and said member removably supported in said opening, and said flow equalization port is of a size smaller than said cylindrical wall opening.

10. The wastewater treatment mechanism as defined in claim 1 wherein said removably supporting means includes an opening in said cylindrical wall, said member removably supported in said opening, said flow equalization port is of a size smaller than said cylindrical wall opening, and said flow equalization port has a center located below a center of said cylindrical wall opening.

11. The wastewater treatment mechanism as defined in claim 1 wherein said removably supporting means includes an opening in said cylindrical wall, said member removably supported in said opening, said flow equalization port is of a size smaller than said cylindrical wall opening, and said flow equalization port has a center located below and in substantial vertical alignment with a center of said cylindrical wall opening.

12. The wastewater treatment mechanism as defined in claim 1 wherein said filtering means comprises a filter member.

13. The wastewater treatment mechanism as defined in claim 1 wherein said filtering means substantially surrounds a portion of said cylindrical wall.

14. The wastewater treatment mechanism as defined in claim 1 wherein said filtering means substantially surrounds a portion of said cylindrical wall along a substantially axial length thereof.

15. The wastewater treatment mechanism as defined in claim 1 wherein said filtering means includes lower filtering means and upper filtering means in relative superposed relationship substantially surrounding said cylindrical wall along a substantial axial length thereof for filtering different sizes of material from wastewater.

16. The wastewater treatment mechanism as defined in claim 2 wherein said removably supporting means includes an opening in said cylindrical wall, said member insertable in said cylindrical wall opening, and said locating means includes a mating recess and projection defined one by said cylindrical wall and another by said member.

17. The wastewater treatment mechanism as defined in claim 2 wherein said removably supporting means includes an opening in said cylindrical wall, said member insertable in said cylindrical wall opening, said locating means includes a mating recess and projection defined one by said cylindrical wall and another by said member, said recess is defined by said cylindrical wall, and said projection is defined by a portion of said flow equalization effecting member.

18. The wastewater treatment mechanism as defined in claim 16 wherein said flow equalization effecting member is of a substantially cup-shaped configuration defined by a peripheral wall and an end wall, said flow equalization effecting member peripheral wall is of a configuration substantially matching said supporting means cylindrical wall opening and is seated therein, and said flow equalization effecting means includes an opening in said end wall.

19. The wastewater treatment mechanism as defined in claim 16 wherein said flow equalization effecting member is of a substantially cup-shaped configuration defined by a peripheral wall and an end wall, said flow equalization effecting member peripheral wall is of a configuration substantially matching said supporting means cylindrical wall opening and is seated therein, and said flow equalization effecting means includes an opening in said end wall contiguous a lowermost portion thereof.

20. The wastewater treatment mechanism as defined in claim 18 wherein said flow equalization effecting member includes a radially outwardly directed flange axially remote from said end wall exteriorly engaging said chamber cylindrical wall adjacent said supporting means cylindrical wall opening for precluding passage of said flow equalization effecting member into an interior of said chamber.

21. The wastewater treatment mechanism as defined in claim 4 including second means for effecting flow equalization in a direction from an exterior of said chamber to an interior of said chamber through said cylindrical wall, and said first-mentioned and second means for effecting flow equalization are in superposed relative relationship to each other.

22. The wastewater treatment mechanism as defined in claim 4 wherein said filtering means substantially surrounds a portion of said cylindrical wall along a substantially axial length thereof.

23. The wastewater treatment mechanism as defined in claim 4 wherein said filtering means includes lower filtering means and upper filtering means in relative superposed relationship substantially surrounding said cylindrical wall along a substantial axial length thereof for filtering different sizes of material from wastewater.

24. The wastewater treatment mechanism as defined in claim 9 including means for accurately locating said flow equalization effecting means relative to said cylindrical wall.

25. The wastewater treatment mechanism as defined in claim 9 including second means for effecting flow equalization in a direction from an exterior of said chamber to an interior of said chamber through said cylindrical wall, and said first-mentioned and second means for effecting flow equalization are in superposed relative relationship to each other.

26. The wastewater treatment mechanism as defined in claim 9 including second means for effecting flow equalization in a direction from an exterior of said chamber to an interior of said chamber through said cylindrical wall, and said first-mentioned and second means for effecting flow equalization are in superposed vertically aligned relative relationship to each other.

27. The wastewater treatment mechanism as defined in claim 9 including second means for effecting flow equalization in a direction from an exterior of said chamber to an interior of said chamber though said cylindrical wall, said first-mentioned and second means for effecting flow equalization are in superposed relative relationship to each other, and said first-mentioned flow equalization effecting means is located below said second flow equalization effecting means.

28. The wastewater treatment mechanism as defined in claim 9 including second means for effecting flow equalization in a direction from an exterior of said chamber to an interior of said chamber through said cylindrical wall, said first-mentioned and second means for effecting flow equalization are in superposed vertically aligned relative relationship to each other, and said first-mentioned flow equalization effecting means is located below said second flow equalization effecting means.

29. The wastewater treatment mechanism as defined in claim 1 wherein said cylindrical wall has a closed bottom wall.

30. A wastewater treatment mechanism comprising a chamber defined in part by a tubular wall, means for effecting flow equalization in a direction from an exterior of said chamber to an interior of said chamber through said tubular wall, and means for removably supporting said flow equalization effecting means relative to said tubular wall whereby said flow equalization effecting means can be removed and replaced by other flow equalization effecting means possessing flow equalization characteristics differing from the flow equalization characteristics of said first-mentioned flow equalization effecting means to maintain a scum line at a height on means for filtering wastewater prior to effecting flow equalization thereof by said flow equalization effecting means that is within predefined wastewater flow characteristics, and said first-mentioned flow equalization effecting means including a member, the member including a flow equalization port disposed in a circular end wall of said flow port member.

31. A wastewater treatment mechanism comprising a chamber defined in part by a tubular wall with a closed bottom wall, means for effecting flow equalization in a direction from an exterior of said chamber to an interior of said chamber through said tubular wall, and means for removably supporting said flow equalization effecting means relative to said tubular wall whereby said flow equalization effecting means can be removed and replaced by other flow equalization effecting means possessing flow equalization characteristics differing from the flow equalization characteristics of said first-mentioned flow equalization effecting means to maintain a scum line at a height on a filter member that is within predefined wastewater flow characteristics, and said first-mentioned flow equalization effecting means including a member, the member including a flow equalization port disposed in a circular end wall of said flow port member.

\* \* \* \* \*